(Model.)
2 Sheets—Sheet 1.
J. SAUDEK.
IDENTIFICATION DEVICE.
No. 513,150. Patented Jan. 23, 1894.
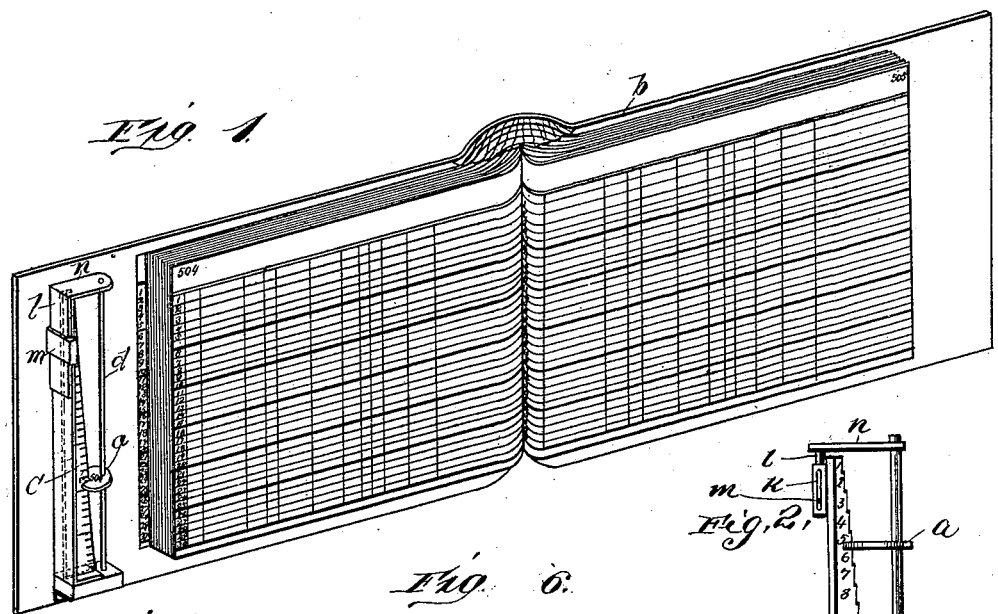
Fig. 1.
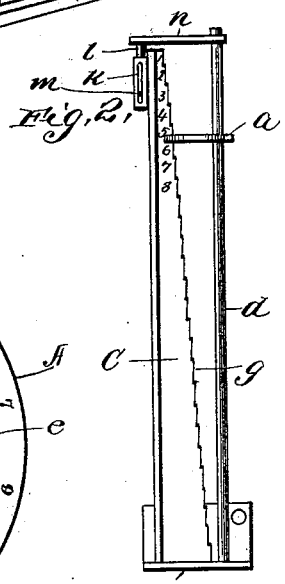
Fig. 2.
Fig. 6.
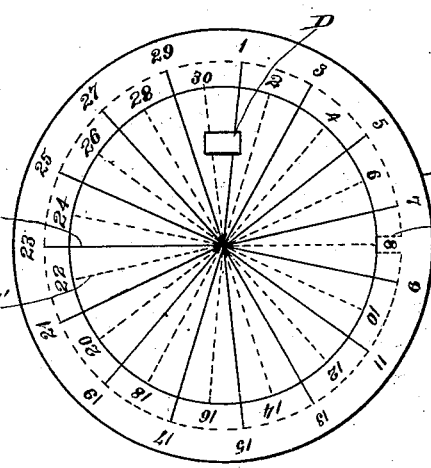
Fig. 4.
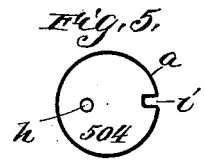
Fig. 5.
Fig. 9.
Fig. 7.
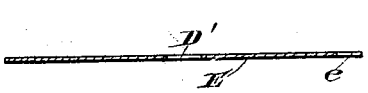
Fig. 8.
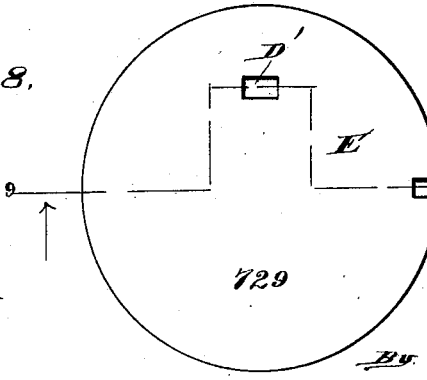
Fig. 3.
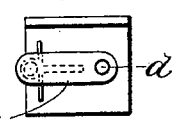
Witnesses:
Chas. E. Forton.
E. A. Duggan.
Inventor:
Jacob Saudek.
By Chas. C. Tillman
Atty.
THE NATIONAL LITHOGRAPHING COMPANY,
WASHINGTON, D. C.

(Model.)
2 Sheets—Sheet 2.
J. SAUDEK.
IDENTIFICATION DEVICE.
No. 513,150.
Patented Jan. 23, 1894.
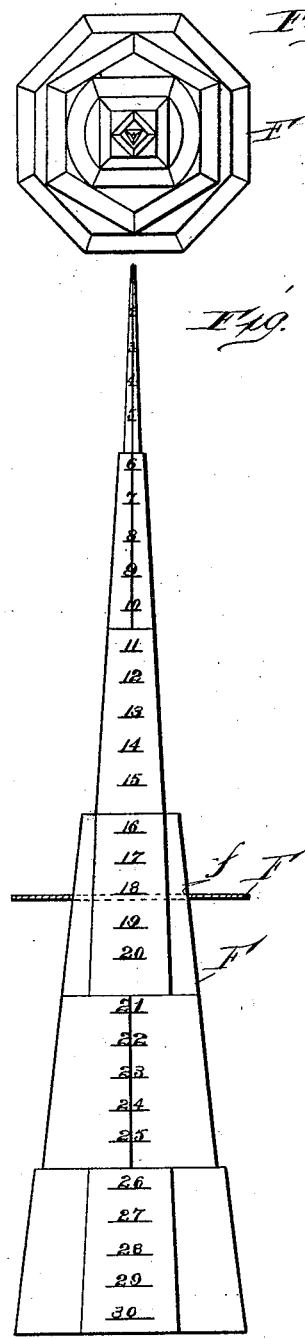
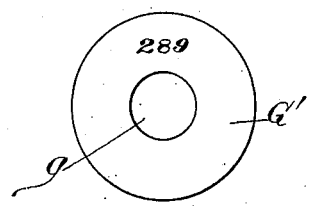
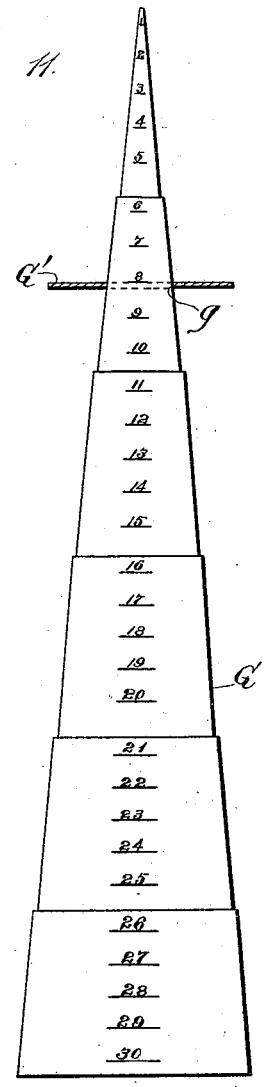
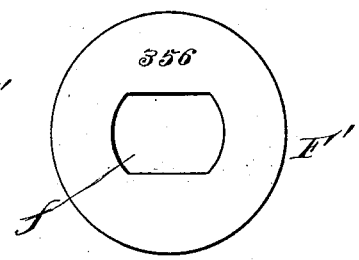
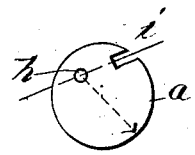
Witnesses:
Chas. E. Foxton
E. A. Duggan
Inventor:
Jacob Saudek
By
Chas. C. Tillman
Atty.

UNITED STATES PATENT OFFICE.

JACOB SAUDEK, OF PITTSBURG, PENNSYLVANIA.

IDENTIFICATION DEVICE.

SPECIFICATION forming part of Letters Patent No. 513,150, dated January 23, 1894.

Application filed November 10, 1892. Serial No. 451,590. (Model.)

*To all whom it may concern:*

Be it known that I, JACOB SAUDEK, a citizen of the United States, residing at Pittsburg, in the county of Allegheny and State of Pennsylvania, have invented certain new and useful Improvements in Identification Devices, of which the following is a specification.

This invention relates to improvements in devices to be used by bank officials or employés to identify persons with whom they are unacquainted, and it consists in certain peculiarities of the construction, novel arrangement, and operation of the various parts thereof, as will be hereinafter more fully set forth and specifically claimed. The annoyance and loss of valuable time occasioned the payee or endorsee of a check, draft or other negotiable papers, by inability to obtain recognition or identification, are well known and appreciated by all business men, and to avoid this annoyance and loss of time by providing banks and other institutions with accurate identification devices, which will enable them to readily identify any particular person, is the object of my invention.

I attain the aforesaid object by the use of a check, an indicator and a record book, and in order to enable others skilled in the art to which my invention pertains to make and use the same, I will now proceed to describe it, referring to the accompanying drawings, in which—

Figure 1, is a perspective view of the record book open, and an indicator and check in position for use. Fig. 2, is a view in elevation of the line indicator detached from the book, with a check in place thereon. Fig. 3, is a plan view of the indicator with the check removed. Fig. 4, is a plan view of one of the checks showing the slot in its periphery at a point nearest the opening therein for the reception of the guide-rod of the indicator. Fig. 5, is a similar view of another check with its slot at a greater distance from the opening for the guide-rod. Fig. 6, is a plan view of a modification of a line indicator showing the check thereon in dotted lines. Fig. 7, is an edge view thereof. Fig. 8, is a plan view of the check to be used on said modification. Fig. 9, is a sectional view thereof, taken on line 9, 9, of Fig. 8. Figs. 10, and 11, are views in elevation on an enlarged scale, for convenience of illustration, of other modifications of line indicators. Figs. 12, and 13, are plan views, respectively thereof. Figs. 14, and 15, are plan views, respectively, of the checks to be used thereon, and Fig. 16, is a plan view of a modification of one of the checks.

Similar letters refer to like parts throughout the different views of the drawings.

*a*, represents a check of any suitable size, form and material, adapted to be issued to any number of individuals, the names, day of month and year of birth, residence, occupation, and particular description of whom are entered in a register or record-book *b*, kept by banks using my device, together with the names of the parents of said individuals, and if desirable, any arbitrary cipher or "password" known only to the respective individuals or subscribers and entered in said book or register, or upon a separate slip or book in the possession of the banks. The backs of said book or register may be of considerably greater width or size than the leaves thereof, and have suitably secured on the inner front thereof, a line indicator C, and rod *d*, which rod is parallel with said indicator and preferably of slightly greater length than the same. The line indicator is of corresponding length with the various leaves of the book or register *b*, and has a series of serrations or teeth *g*, usually of the form shown in Fig. 2, corresponding in number with the lines on said leaves respectively, the length of said serrations being equal to the width of the spaces between the lines on the leaves of the book and in depth, about one thirty-second of an inch to admit of the check being substantially of the size shown in Figs. 4, and 5, of the drawings.

The checks *a*, have respectively stamped or otherwise displayed on the face thereof, a number, and are provided with a vertical perforation *h*, eccentric with the same, and large enough to snugly fit over the guide-rod *d*, and of the same form as said rod in cross-section. Each of said checks is also provided in its periphery with a notch or open slot *i*, of uniform depth, located in one side of the circumference of said check in such a way that the notch corresponding with line (1) one, of any particular page of the record or register will be at the maximum distance from the center of the eccentrically located orifice $h$, and decreasing as the same approaches the opposite side of the check, whereby when the said check is slipped over said rod by means of said perforation or opening, and the notch or slot $i$, therein turned against and striding the serrated edge of the line indicator, said check is enabled to slip downward upon said rod and indicator, until it is eventually stopped by one of its teeth or projections, thereby indicating that the check is or was issued to a person, the name and further means of identification of whom are entered upon a page designated by the number on the face of the check, and line thereon corresponding with the number of the serration on the line indicator, upon which the check is stopped or rests. At the top of the line indicator and suitably secured to the back of the same, is a slide $k$, in which the arm $l$, is adapted to move freely, a pin $m$, projecting in a slot therein to prevent the same from falling out of said slide; secured to or integral with said arm $l$, is a bar $n$, projecting at right angles therefrom toward the guide-rod $d$. Said bar is provided at its outer end with an orifice to fit over the rod $d$, in order that the same may be maintained uniformly the same distance from the line indicator.

In Fig. 2, of the drawings, it will be seen that a few only of the serrations or teeth of the line indicator have been numbered, (this being deemed sufficient to illustrate the device) but it will be understood that each serration or tooth or other indicating mark thereon is numbered to correspond with its respective line number upon the page of the book or register. It will also be understood that the indicator C, may be hinged at its face to the inner surface of the front of the book, so that it, the indicator may be raised to a vertical position, when the check is being slipped on the guide-rod $d$, and lowered to a horizontal position, if desired, when the inner edge of the check will align with the line corresponding with the number of the serration or tooth upon which the check rests. It is for this purpose and also for the reason that when not in use, the indicator may be folded or inclosed between the covers of the book, that I may make the same of greater dimensions than the pages thereof.

In Fig. 6, I have shown a modification of the line indicator, which I may sometimes use instead of the one above described, and in employing this modification, which is a circular impression or disk A, which may be printed, stamped upon or otherwise delineated on the back of the record-book, or its leaves, or on an independent or separate piece of material, and is provided near its periphery with numbers corresponding with the number of lines on the respective pages of the register or book, the odd numbers being preferably located near the periphery of the circle, and the even ones a slight distance inwardly therefrom. As shown in Fig. 6, this indicator has a number of radial lines B, and C', the lines B, being longer than the lines C', and pointing to the odd numbers on the indicator, while the lines C', point to the even numbers thereof.

Upon the face of the disk or impression A, is provided a projection D, which is designed to fit within the orifice D', of the check E, which check has upon its face, a number, and is provided on its periphery with an open slot or notch $e$, which slot when placed on the indicator A, will expose one of the inner or even numbers, as shown by dotted lines in Fig. 6, which illustrates the indicator having thereon the check shown in dotted lines. When the notch or slot $e$, is located in the check E, so as to indicate one of the outer or odd numbers, it will expose a portion of the long line B, pointing thereto, which will aid the eye in ascertaining the number indicated. As a further aid, I may have the odd or outer numbers made of one color, and the inner or even numbers of another color. It is obvious that the projection D, may be made of any form or size, or may be simply an impression upon the face of the indicator, with which the orifice D', in the check must conform both as to size and shape; for instance, a rectangular impression may be used on the indicator and a similarly shaped orifice in the check, as shown in the drawings, or a triangular or other formed impression may be used, and a corresponding orifice in the check, when, if the orifice in the check is placed over the impression or projection D, on the indicator, and the lines thereof brought into alignment, the notch or slot $e$, will accurately indicate the line number, on the disk, corresponding with a similar number on the pages of the register, which is the same as first above described.

In Figs. 6, to 9, inclusive, I have shown the indicator and its check on an enlarged scale, in order that the parts may be more perfectly illustrated. Figs. 10, and 12, represent enlarged elevation and plan views, respectively, of another modification of the indicator, which consists of a rod F, of varying cross-section both as to size and form, upon which are located numbers to correspond with the numbers on the pages of the record-book, as has been fully set out in the description of the first named indicator. With this indicator, I use a check F', which may be in the form of a ring or other shape, if desired, and provided on its face with a number and through its central portion with an orifice $f$, of a size and form to correspond with the varying cross-section of the rod or pin F.

As is clearly shown in Fig. 12, the upper portion of the rod F, may be triangular in form, the next section below square, and so on, and the orifice in the checks of a form and size adapted to fit over the various forms of the pin or rod. In Figs. 11, and 12, is illustrated still another modification in enlarged views in elevation and plan, respectively, which consists of a rod or pin G, varying in cross-section, in size, only. The check G, having on its face a number, and provided centrally with an opening or orifice $g$, is used upon this indicator in a similar manner to the check named in the last described modification.

From the foregoing statement, it will be understood that either of the indicators F, and G, can be hinged to the cover of the book, if desired, the same as the indicator C, and that the operation of the checks thereon is virtually the same. It is also apparent that the orifice D', in the check E, is located out of the center thereof, as shown, for the purpose of ascertaining the number indicated. It is further obvious, that in using the indicator C, the slots or notches $i$, therein should be so formed that, a straight line drawn through the middle of said notch, will pass through the center of the eccentric orifice $h$, in the same.

The operation of my device is as follows, viz: A subscriber being the payee or indorsee of a draft or check payable at a bank using my invention, and not being known or in position to have himself or herself identified there, as such payee, can by presenting his or her identification check to the teller of said bank, together with a description of a recorded evidence of identification contained in said book, enable said teller to ascertain whether or not the person presenting the identification check is the payee of said draft and the rightful owner of said identification check; first by ascertaining as heretofore stated, the page and line thereof in said registry book on which the name, &c., of the proper owner of the identification check is entered, and whether or not the written description furnished by said party presenting the draft corresponds with that contained in said book; and finally, before paying said draft or check compel the party presenting the same to give an arbitrary pass-word or cipher known only to the bank officials and the rightful holder of said identification check, thereby enabling the bank to identify parties personally unknown to them more positively than if identified by a second party known to said bank. It is obvious that successful use of said checks cannot be had without the collusive assistance of the rightful identification check holder, as the check must not only indicate the page and line of recorded evidence, but the party presenting the same must answer in every respect the contents of said line and also give pass-word only known to the rightful holder of said check.

In Fig. 16, is shown a plan view of a modification of one of the checks to be used on the line indicator illustrated in Figs. 1, and 2, which consists of a check $a$, having an eccentrically located guide-orifice $h$, and a mark, or design (which is shown in the present instance as the representation of an arrow), to indicate on the indicator at or on what serration the check will rest. Of course the design or mark may be of any suitable kind, but preferably of such a nature or form, as to show that its radial point is the center of the orifice $h$, as is also the case of the slots $i$, one of which is shown in said figure with a line drawn through its center for this purpose.

Having thus fully described my invention, what I claim as new, and desire to secure by Letters Patent, is—

1. A book or register having recorded on parallel lines of the pages thereof, identification data, a line indicator having designating marks or designs to correspond with the said lines, and a check having a number thereon, and figured, marked, cut or shaped to correspond with a figure, mark or design upon any particular line of a specific page of said book, substantially as described.

2. A book or register having recorded on the pages thereof identification data, a line indicator having designating marks or designs to correspond with said lines, and a check having a number thereon and an eccentrically located guide-orifice, and figured, marked, cut or shaped to correspond with a figure, mark, cut or design upon any particular line of a specific page of said book, substantially as described.

3. In an identification device, the combination of a book or register having recorded on parallel lines uniformly distant apart, on the pages thereof identification data, with a line indicator attached to said book and having designating marks or designs to correspond with said lines, a check having a number thereon, and figured, marked, cut or shaped to correspond with a figure, mark, or design upon any particular line of a specific page of said book, substantially as described.

4. In an identification device, the combination of a book or register having recorded on parallel lines uniformly distant apart on the pages thereof identification data, with a line indicator attached to said book and having designating marks or designs to correspond with said lines, a guide for the check, said check having a number thereon and an eccentrically located guide-orifice, and figured, numbered, marked, cut or shaped to correspond with a figure, mark, cut or design upon any particular line of a specific page of said book, substantially as described.

5. In an identification device the combination of a book or register having recorded on parallel lines equi-distant apart on the pages thereof identification data, with a line indicator having a guide for the check and designating marks or designs to correspond with said lines, a check having a number thereon, an eccentrically located guide-orifice, and an open slot or notch in its periphery adapted to designate on the line indicator a figure, cut, mark or design corresponding to the same, substantially as described.

6. In an identification device, the combination with a book or register having recorded on parallel lines on the pages thereof identification data, of a line indicator varying in cross-section, and having a series of figures, marks, or designs corresponding in number with the lines on any particular page of said book, and a check having a number thereon and a guide-orifice therein, and figured, marked, cut or shaped to designate on the line indicator a figure, mark, cut or design, corresponding with those on the lines of said book, substantially as described.

7. In an identification device, the combination of a book or register having recorded on the pages thereof identification data, with a line indicator varying in cross-section, hinged at its lower portion to the book, and having a series of figures, marks, or designs corresponding in number with the lines on any particular page of said book, and a check having a number thereon, and a guide-orifice therein, and figured, marked, cut or shaped to designate on the line indicator a figure, mark, cut or design corresponding with those on a particular page of said book, substantially as described.

8. In an identification device, the combination of a book or register having recorded on parallel lines of the pages thereof identification data, with a line indicator having a series of serrations corresponding in number with the lines on any particular page of said book, a guide-rod parallel with the indicator, a check having a number thereon, and an eccentrically located guide-orifice, and a designating cut, mark or design located therein, and adapted to rest upon any particular serration of the line indicator, accordingly as said eccentrically located guide-orifice is nearest to or farthest from the same, substantially as described.

9. In an identification device, the combination of a book or register having recorded on parallel lines on the pages thereof identification data, with a line indicator hinged to said book, and having a series of serrations corresponding in number with the lines on any particular page of the book, a guide-rod hinged with the indicator, and parallel thereto, a check having a number thereon, and an eccentrically located guide-orifice, and a designating cut, mark or design located thereon, and adapted to rest upon any particular serration of the line indicator, accordingly as said guide-orifice is nearest to or farthest from the same, substantially as described.

10. In an identification device, the combination of a book or register having recorded on parallel lines on the pages thereof identification data, with a line indicator hinged to said book, and having a series of serrations corresponding in number with the lines on any particular page of the book, a guide-rod hinged with said indicator and parallel thereto, said indicator having a movable bar at right angles thereto at its top and provided with an opening in its outer end adapted to fit over the rod, and a check having a number thereon, and an eccentrically located guide-orifice, and a designating cut, mark, or design located thereon, and adapted to rest upon any particular serration of the line indicator, accordingly as said eccentrically located orifice in the check is nearest to or farthest from the same, substantially as described.

11. A book, the backs of which are of greater width than the leaves thereof, a line indicator, suitably hinged on the inner front of the back of said book, and having series of serrations corresponding in number with the lines on any particular page of said book, a rod hinged with said indicator, and parallel therewith, said indicator having a movable bar at right angles thereto, at the top thereof, and provided with an orifice in its outer end, adapted to fit over said rod, and a check having a number thereon, and an eccentric perforation therein, and a notch adapted to rest upon any particular serration of said indicator, accordingly as said eccentric perforation in said check is nearest to or farthest from the same, substantially as described.

In testimony that I claim the foregoing I hereunto affix my signature this 9th day of November, A. D. 1892.

JACOB SAUDEK. [L. S.]

In presence of—
 JAS. J. MCAFEE,
 M. J. J. DOYLE.